United States Patent
Cox et al.

(10) Patent No.: US 9,342,370 B2
(45) Date of Patent: May 17, 2016

(54) SERVER MIGRATION

(75) Inventors: Michael C. Cox, Ijamsville, MD (US); John C. Goodyear, Mount Airy, MD (US); Charles E. Hackett, Greenlawn, NY (US); Kathleen M. Walsh, Laytonsville, MD (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 13/483,512

(22) Filed: May 30, 2012

(65) Prior Publication Data

US 2013/0326028 A1     Dec. 5, 2013

(51) Int. Cl.
G06F 9/50       (2006.01)
G06F 9/48       (2006.01)
G06F 9/54       (2006.01)
G06F 9/455      (2006.01)

(52) U.S. Cl.
CPC .......... *G06F 9/5077* (2013.01); *G06F 9/45558* (2013.01); *G06F 9/4856* (2013.01); *G06F 2009/4557* (2013.01); *G06F 2209/501* (2013.01)

(58) Field of Classification Search
CPC .. G06F 9/4856; G06F 9/5077; G06F 9/45558
See application file for complete search history.

(56) References Cited

U.S. PATENT DOCUMENTS

| | | | |
|---|---|---|---|
| 6,937,706 B2 | 8/2005 | Bscheider et al. | |
| 2004/0025157 A1 | 2/2004 | Blight et al. | |
| 2006/0069717 A1 | 3/2006 | Mamou et al. | |
| 2008/0235378 A1* | 9/2008 | Fried et al. | 709/226 |
| 2008/0235388 A1* | 9/2008 | Fried et al. | 709/231 |
| 2008/0320122 A1* | 12/2008 | Houlihan et al. | 709/224 |
| 2008/0320269 A1* | 12/2008 | Houlihan et al. | 711/203 |
| 2011/0246298 A1 | 10/2011 | Williams et al. | |

FOREIGN PATENT DOCUMENTS

| | | |
|---|---|---|
| WO | 2008014346 A2 | 1/2008 |
| WO | 2011088261 A2 | 7/2011 |

OTHER PUBLICATIONS

Ahmadi et al., "Performance Evaluation of Server Virtualization in Data Center Applications," 2012, pp. 638-644, 2010 5th International Symposium on Telecommunications.

* cited by examiner

*Primary Examiner* — Larry Donaghue
(74) *Attorney, Agent, or Firm* — Douglas A. Lashmit; Hoffman Warnick LLC

(57) ABSTRACT

In one embodiment, the invention provides a method of configuring a migration from a plurality of distributed virtual servers to a system of blades, the method comprising: identifying among the plurality of distributed virtual servers a plurality of candidate virtual servers for inclusion in the migration; collecting performance data for each candidate virtual server; consolidating the performance data for each candidate virtual server into a usage profile; normalizing the usage profile to allow representation of a statistical measure of resource usage by the candidate virtual server; and constructing a configuration for the plurality of candidate virtual servers within the system of blades.

20 Claims, 4 Drawing Sheets

SERVER MIGRATION

BACKGROUND

The migration of servers from one system to another, if it is to provide improved efficiency, better performance, or other features typically sought in performing a migration, requires an accurate assessment of the current server needs and the resources available in the new system. Often, the new system provides clearly superior resources in terms of central processing unit (CPU) capacity, input/output (I/O) bandwidth, etc.

Server migration becomes more complex, however, where the current servers span a plurality of technology platforms, operating systems, etc. More complex still is a server migration where the target system includes multiple virtual servers. Constructing a valid configuration for a new system requires a great deal of planning and often involves a good deal of trial and error. Constructing a valid configuration is even more difficult where, for example, the new system includes a system of blades and/or is intended to be "closed" or fixed in terms of its resources or where the migration of virtual servers to the new system includes limitations as to the locations to which servers may be located (e.g., particular virtual servers must or must not be located together and/or must or must not be located with other virtual servers).

SUMMARY

In one embodiment, the invention provides a method of configuring a migration from a plurality of distributed virtual servers to a system of blades, the method comprising: identifying among the plurality of distributed virtual servers a plurality of candidate virtual servers for inclusion in the migration; collecting performance data for each candidate virtual server; consolidating the performance data for each candidate virtual server into a usage profile; normalizing the usage profile to allow representation of a statistical measure of resource usage by the candidate virtual server; and constructing a configuration for the plurality of candidate virtual servers within the system of blades.

In another embodiment, the invention provides a method of configuring a server migration from a plurality of distributed virtual servers to a system of blades, the method comprising: receiving performance data for each of a plurality of distributed virtual servers to be included in a migration from the plurality of distributed virtual servers to a system of blades; reducing the performance data for each distributed virtual server to be included in the migration into a usage profile; normalizing each usage profile to derive a statistical measure of resource usage by the distributed virtual server; and constructing a configuration for the plurality of distributed virtual servers within the system of blade servers.

In still another embodiment, the invention provides a system comprising: at least one computing device for configuring a migration from a plurality of distributed virtual servers to a system of blades by performing a method comprising: identifying among the plurality of distributed virtual servers a plurality of candidate virtual servers for inclusion in the migration; collecting performance data for each candidate virtual server; consolidating the performance data for each candidate virtual server into a usage profile; normalizing the usage profile to allow representation of a statistical measure of resource usage by the candidate virtual server; and constructing a configuration for the plurality of candidate virtual servers within the system of blades.

In yet another embodiment, the invention provides a program product stored on a computer-readable storage medium, which when executed, is operable to configure a migration from a plurality of distributed virtual servers to a system of blades by performing a method comprising: identifying among the plurality of distributed virtual servers a plurality of candidate virtual servers for inclusion in the migration; collecting performance data for each candidate virtual server; consolidating the performance data for each candidate virtual server into a usage profile; normalizing the usage profile to allow representation of a statistical measure of resource usage by the candidate virtual server; and constructing a configuration for the plurality of candidate virtual servers within the system of blades.

The illustrative aspects of the present invention are designed to solve the problems herein described and other problems not discussed, which are discoverable by a skilled artisan.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION

Figure 1:
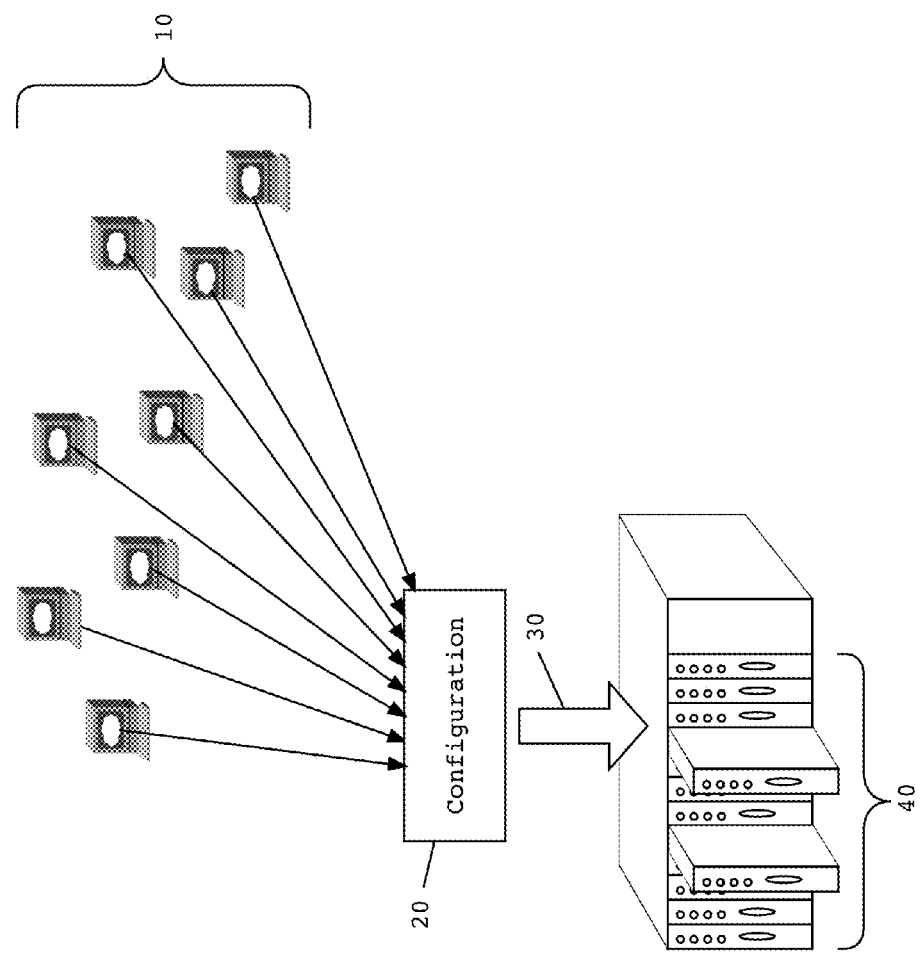
FIG. 1 is a schematic view of a migration of a plurality of distributed virtual servers to a system of blades.

FIG. 1 shows a simplified graphical representation of a process by which a plurality of candidate virtual servers 10 is mapped 30 to a system of blades 40 using a configuration method 20 according to various embodiments of the invention.

As used herein, the term "server" is meant to refer to a manifestation of an operating system, middleware, and application software that is hosted on a hardware configuration that will provide CPU, memory, network, and storage functions. Servers hosted on virtualized hardware are referred to as "virtual servers." The size of a virtual server will vary based on CPU, memory, network, and storage requirements. A "blade" refers to the hardware on which a server or one or more virtual servers is hosted. The blade provides the resources needed by a server or virtual server, such as CPU, memory, network attachment, storage attachment, etc. Blades are also available in different architectures, sizes, amounts of CPU capacity, memory, network bandwidth, etc. A "system of blades," in turn, refers to a collection of one or more groups of blades and provides a management infrastructure, resources (e.g., electrical power), and allows for the sharing of infrastructure among the blades. Sharing infrastructure places constraints on the amount of network and storage capacity that a group of blades has in total.

Figure 2:
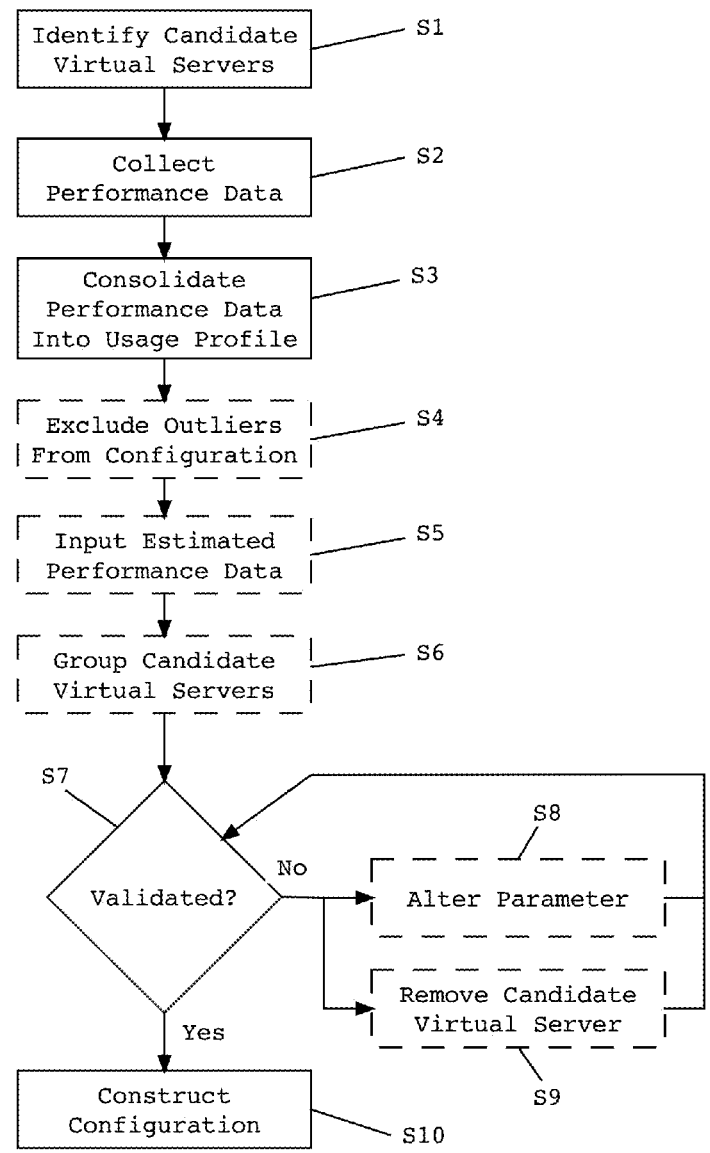
FIG. 2 is a flow diagram of a method according to one embodiment of the invention.

FIG. 2 shows a flow diagram of a method according to one embodiment of the invention. At S1, a plurality of candidate virtual servers are identified from among a plurality of distributed virtual servers, the identified candidate virtual servers to be included in the migration to a system of blades. A distributed server may be identified as a candidate virtual server for any number of reasons, such as equipment obsolescence, consolidation of multiple distributed servers for the sake of efficiency, etc.

At S2, performance data are collected for each of the candidate virtual servers identified at S1. Typically, such performance data will include key performance metrics, such as CPU demand, I/O bandwidth, etc. Performance data collected at S2 may include many days worth of data. As such, performance data may be consolidated at S3 into a usage profile. This may include, for example, a 24-hour usage profile that represents statistical measures of resource usages. Such consolidation or normalization may include, for example, synchronizing performance data to a reference time zone, such that resource usages of candidate virtual servers in different time zones are synchronized and accurately reflect usage of resources common to the candidate virtual servers. Such consolidation or normalization may also be carried out irrespective of technology used by the distributed virtual servers. That is, consolidation or normalization may be carried out for a first candidate virtual server using a first technology (e.g., operating system, chip set, etc.) and a second candidate virtual server using a second technology different than the first technology.

At S4, candidate virtual servers exhibiting outlier performance characteristics (e.g., unusually or unacceptably high or low values for one or more performance metric) may optionally be excluded from a server configuration that may be later constructed. Alternatively, or in addition, estimated performance data may be input at S5. For example, outlier performance data may be replaced with estimated performance data where the outlier performance data are believed to be anomalous. In other cases, it may be the case that performance data cannot be collected for a candidate virtual server. This could be a consequence of any number of situations including, for example, a lack of measurement software, security issues, disk storage limitations, collection errors that have not been corrected, or because a particular server does not yet exist.

At S6, candidate virtual servers may optionally be grouped. This can be done, for example, to ensure that particular candidate virtual servers are or are not moved to the same blade. A need to group and segregate candidate virtual servers may be based on ownership and/or security requirements of particular candidate virtual servers. For example, a customer may require that their candidate virtual servers be mapped to a blade that is not shared with a candidate virtual server owned by anyone else. Additional grouping (sub-grouping) can be defined for any given group. This additional grouping is provided to allow dispersion within the named group of candidate virtual servers to provide high availability. For example, where the failure of a single blade would result in an application failure if it contained all of the candidate virtual servers hosting an application (i.e., the blade represents a single point of failure), the candidate virtual servers may be grouped at S6 to ensure that the relevant candidate virtual servers are not placed on the same blade. In some cases, a group may contain as few as one candidate virtual server.

At S7, a validation may be performed wherein, for example, it is determined whether, given the candidate virtual servers and the parameters of the target system of blades, a mapping configuration is achievable that is not violative of one or more parameters. It may be the case that no blade in the system of blades is sufficient to service one or more of the candidate virtual servers. For example, CPU demand of a candidate virtual server may exceed blade capacity. In still other cases, one or more parameters (e.g., I/O bandwidth, network bandwidth, etc.) at the aggregation level of the target system of blades is insufficient.

If a valid configuration cannot be achieved (i.e., No at S7), one or more parameters may be altered at S8 and/or one or more offending (i.e., responsible for an invalid configuration) candidate virtual servers may be removed at S9. Flow may then return to S7 to determine whether, given the remaining candidate virtual servers and/or the altered parameter(s), a mapping configuration is achievable. If so (i.e., Yes at S7), one or more configurations may be constructed at S10. As will be explained in greater detail below, construction of configuration(s) at S10 may include application of a genetic algorithm.

In some embodiments of the invention, constructing a configuration may include, for example, calculating for a group of at least one candidate virtual server projected resource use during a pre-defined period based on a pre-defined growth rate. Other embodiments of the invention may include mapping, within a group, at least two candidate virtual servers to a sub-group and, in turn, mapping of the candidate virtual servers of the sub-group to blades such that no more than one candidate virtual server of the sub-group is on a common blade.

In some embodiments of the invention, configuring a migration may further include automatically generating a graphical report and/or a textual report regarding the configuration. Such reports may include, for example, the distributed virtual servers included in the migration, a proposed target configuration, a topology of groups of distributed virtual servers, information regarding outlier conditions, or methods by which outlier conditions were addressed in the creation of a target configuration.

Figure 3:
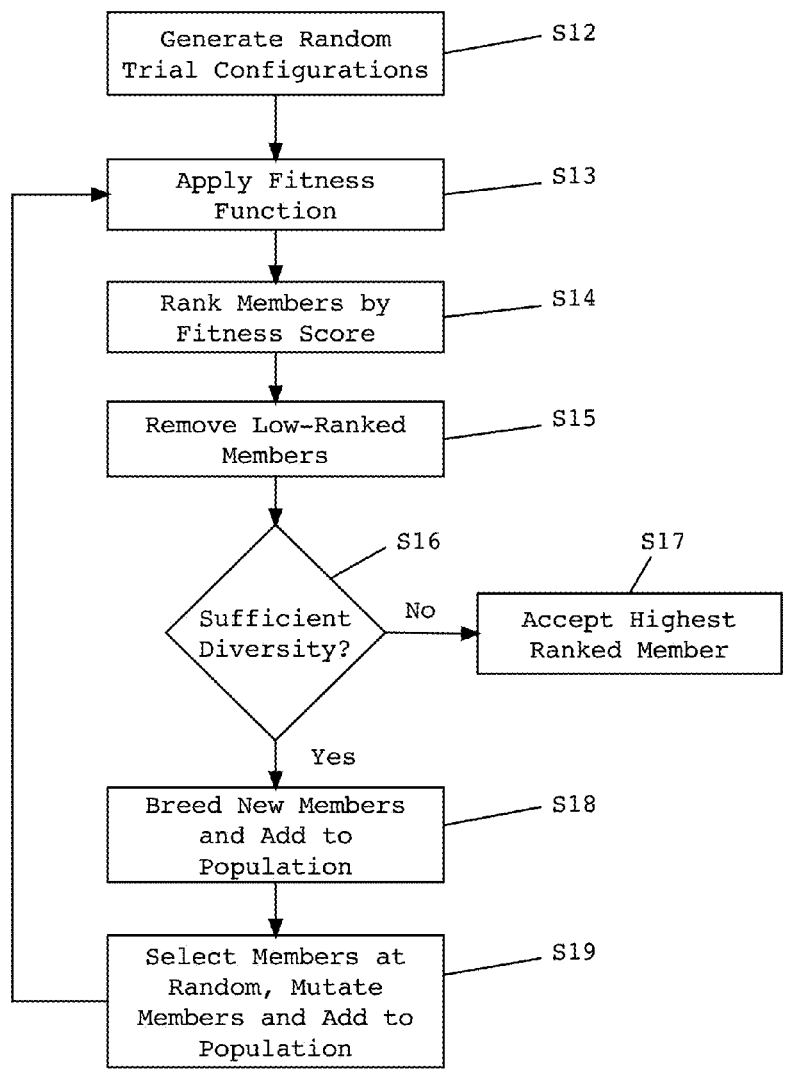
FIG. 3 is a flow diagram of a genetic algorithm that may be employed in constructing a configuration according to some embodiments of the invention.

FIG. 3 shows a flow diagram of a method according to an illustrative genetic algorithm. One skilled in the art will understand, of course, that other genetic algorithms may be employed according to various embodiments of the invention.

At S12, a number of random trial configurations for the migration are generated. A fitness function may then be applied at S13. The fitness function imparts a valuation to each of the trial configurations generated at S12. A valid configuration that would receive the lowest valuation is a configuration that maps each virtual server to its own blade.

The fitness function may take into account a number of configuration parameters and assign a number of valuations. For example, the fitness function may include a first value equal to the number of blades required for the configuration. The fitness function may also include a second value reflecting CPU usage or CPU resources available under the configuration. This second value may be useful, for example, in ranking or choosing between configurations having the same number of blades required.

Similarly, invalid configurations may also be valuated using the fitness function. For example, valuation of an invalid configuration may comprise twice the number of blades required less the number of valid blades constructed. This ensures that invalid configurations receive valuations that are less than the valuations of valid configurations and also that invalid configurations having fewer valid blades receive valuations that are less than the valuations of invalid configurations having more valid blades.

Trial configurations may then be ranked according to their fitness scores at S14 and low-ranked configurations removed at S15. In this way, least fit configurations are culled from the configuration "population," as would be a least fit gene or characteristic from a biological population.

At S16, it is determined whether the remaining configurations include sufficient diversity to continue running the genetic algorithm. That is, it may be determined whether the valid configurations are sufficiently similar or are coalescing around a particular configuration that continuing with the genetic algorithm would be of little value. In theory, the genetic algorithm could be run indefinitely until a single configuration is obtained. In practice, however, the time and resources expended in determining the best configuration must be practical. If the remaining configurations do not contain sufficient diversity (i.e., No at S16), the highest-ranked configuration may be accepted as the best configuration at S17.

If sufficient diversity remains within the configurations (i.e., Yes at S16), new configurations may be "bred" from those remaining and added to the configuration population at S18. Configurations may then be selected at random, mutated, and added to the configuration population at S19. Flow may then return to S13 and iterated until sufficient diversity is found not to remain (i.e., No at S16), at which time the highest-ranked configuration is accepted as the best configuration at S17.

Figure 4:
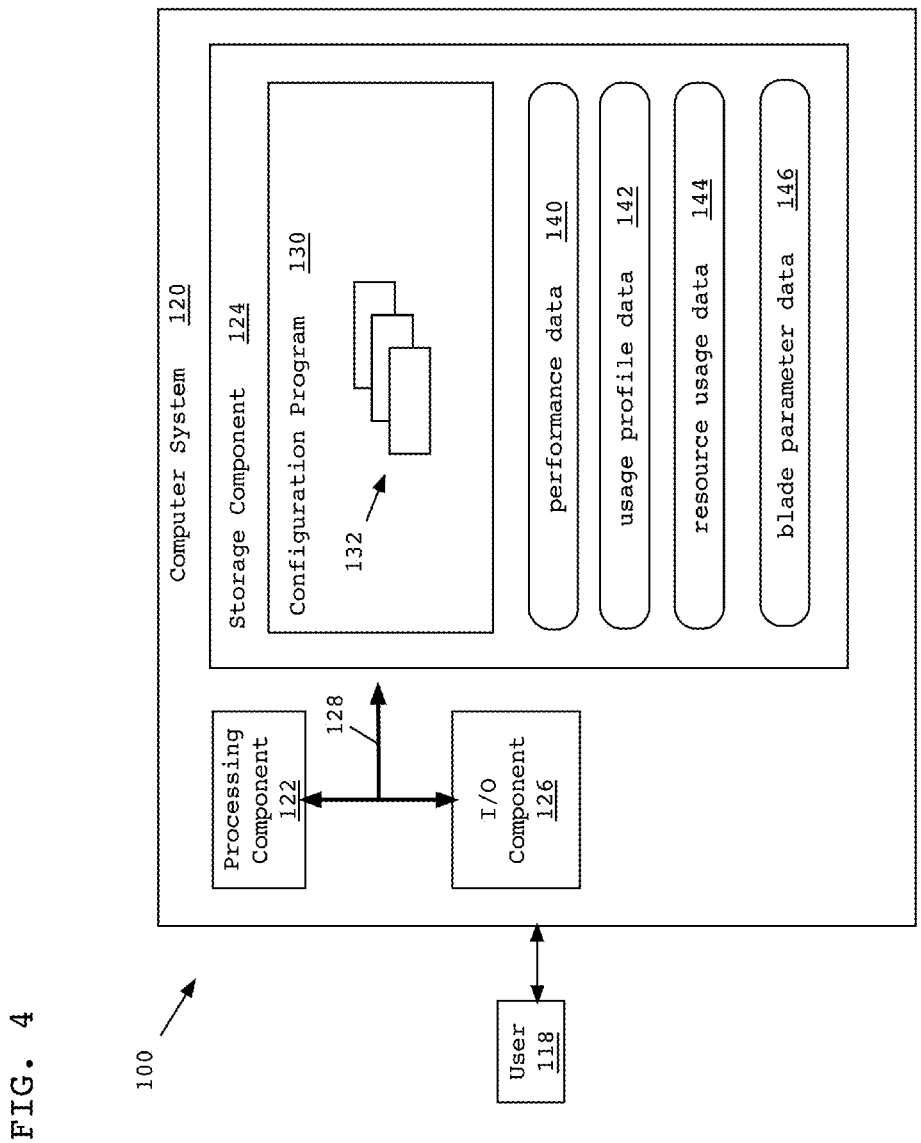
FIG. 4 is a schematic representation of a computing environment according to an embodiment of the invention.

FIG. 4 shows an illustrative environment 100 for configuring a migration from a plurality of distributed virtual servers to a system of blades. To this extent, environment 100 includes a computer system 120 that can perform a process described herein in order to configure a migration from a plurality of distributed virtual servers to a system of blades. In particular, computer system 120 is shown including a configuration program 130, which makes computer system 120 operable to configure a migration from a plurality of distributed virtual servers to a system of blades by performing a process described herein.

Computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In general, processing component 122 executes program code, such as configuration program 130, which is at least partially fixed in storage component 124. While executing program code, processing component 122 can process data, which can result in reading and/or writing transformed data from/to storage component 124 and/or I/O component 126 for further processing. Pathway 128 provides a communications link between each of the components in computer system 120. I/O component 126 can comprise one or more human I/O devices, which enable a human user, such as user 118, to interact with computer system 120 and/or one or more communications devices to enable a system user (e.g., another computer system used to interact with user 118) to communicate with computer system 120 using any type of communications link. To this extent, configuration program 130 can manage a set of interfaces (e.g., graphical user interface(s), application program interface, and/or the like) that enable human and/or system users to interact with configuration program 130. Further, configuration program 130 can manage (e.g., store, retrieve, create, manipulate, organize, present, etc.) the data, such as performance data 140, usage profile data 142, resource usage data 144, and blade parameter data 146 using any solution.

In any event, computer system 120 can comprise one or more general purpose computing articles of manufacture (e.g., computing devices) capable of executing program code, such as configuration program 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, configuration program 130 can be embodied as any combination of system software and/or application software.

Further, configuration program 130 can be implemented using a set of modules 132. In this case, a module 132 can enable computer system 120 to perform a set of tasks used by configuration program 130, and can be separately developed and/or implemented apart from other portions of configuration program 130. As used herein, the term "component" means any configuration of hardware, with or without software, which implements the functionality described in conjunction therewith using any solution, while the term "module" means program code that enables a computer system 120 to implement the actions described in conjunction therewith using any solution. When fixed in a storage component 124 of a computer system 120 that includes a processing component 122, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device can have only a portion of configuration program 130 fixed thereon (e.g., one or more modules 432). However, it is understood that computer system 120 and configuration program 130 are only representative of various possible equivalent computer systems that may perform a process described herein. To this extent, in other embodiments, the functionality provided by computer system 120 and configuration program 130 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 120 includes multiple computing devices, the computing devices can communicate over any type of communications link. Further, while performing a process described herein, computer system 120 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, configuration program 130 enables computer system 120 to configure a migration from a plurality of distributed virtual servers to a system of blades. To this extent, computer system 120 can acquire and/or utilize information before, during, and after configuring such a migration.

For example, computer system 120 can acquire and/or utilize performance data 140 corresponding to a candidate virtual server. The performance data 140 can comprise various information regarding a candidate virtual server. Computer system 120 also can acquire and/or utilize usage profile data 142, resource usage data 144, and/or blade parameter data 146.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of configuring a migration from a plurality of distributed virtual servers to a system of blades, the method comprising:
    identifying among the plurality of distributed virtual servers a plurality of candidate virtual servers for inclusion in the migration;
    collecting performance data for each candidate virtual server;
    consolidating the performance data for each candidate virtual server into a usage profile;
    normalizing the usage profile to allow representation of a statistical measure of resource usage by the candidate virtual server;
    constructing a configuration of the plurality of candidate virtual servers within the system of blades; and
    configuring the plurality of candidate virtual servers within the system of blades with the constructed configuration.

2. The method of claim 1, further comprising:
    validating the configuration against a pre-selected hardware target for the system of blades, the pre-selected hardware target being selected from a group consisting of: a memory demand on a server blade, a central processing unit (CPU) demand on a server blade, an input/output (I/O) bandwidth demand on a target system of blades, and a network demand on a target system of blades.

3. The method of claim 2, wherein, in the case that validating the configuration results in a failure of the configuration, the method further comprises at least one of the following: removing at least one candidate virtual server from the migration, altering the relevant resource in demand of at least one candidate virtual server, or altering the pre-selected hardware target.

4. The method of claim 2, wherein, in the case that validating the configuration results in a validation of the configuration, the method further comprises:
    saving the configuration.

5. The method of claim 1, wherein normalizing the usage profile includes normalizing a first usage profile of a first candidate virtual server using a first technology and normalizing a second usage profile of a second candidate virtual server using a second technology different than the first technology.

6. The method of claim 1, further comprising:
    grouping at least one of the candidate virtual servers; and
    within the configuration, mapping the group of at least one candidate virtual servers to a set of blades and excluding from the set of blades any candidate virtual servers not included in the group.

7. The method of claim 6, further comprising:
    mapping, within the group, at least two candidate virtual servers to a sub-group; and
    mapping of the candidate virtual servers of the sub-group to blades such that no more than one candidate virtual server of the sub-group is on a common blade.

8. The method of claim 6, wherein constructing a configuration includes calculating for the group of at least one candidate virtual server projected resource use during a pre-defined period based on a pre-defined growth rate.

9. The method of claim 1, further comprising:
    determining whether the performance data include outlier values; and
    in the case that outlier values are determined to exist:
        flagging the outlier values; and
        excluding the outlier values when constructing the configuration.

10. The method of claim 1, further comprising:
    determining whether the plurality of candidate virtual servers includes an unmeasured virtual server for which performance data cannot be collected; and
    in the case that it is determined that performance data cannot be collected for a candidate virtual server, inputting estimated performance data for the unmeasured virtual server.

11. The method of claim 1, wherein consolidating the performance data includes synchronizing the performance data for at least one candidate virtual server to a reference time zone.

12. The method of claim 1, wherein the constructing the configuration includes using a genetic algorithm.

13. A method of configuring a server migration from a plurality of distributed virtual servers to a system of blades, the method comprising:
    receiving performance data for each of a plurality of distributed virtual servers to be included in a migration from the plurality of distributed virtual servers to a system of blades;
    reducing the performance data for each distributed virtual server to be included in the migration into a usage profile;
    normalizing each usage profile to derive a statistical measure of resource usage by the distributed virtual server;
    constructing a configuration of the plurality of candidate virtual servers within the system of blades; and
    configuring the plurality of candidate virtual servers within the system of blades with the constructed configuration.

14. The method of claim 13, further comprising:
automatically generating at least one of a graphical report or a textual report,
wherein the at least one of a graphical report or a textual report includes at least one of the following: the distributed virtual servers included in the migration, a proposed target configuration, a topology of groups of distributed virtual servers, information regarding outlier conditions, or methods by which outlier conditions were addressed in the creation of a target configuration.

15. The method of claim 13, wherein normalizing each usage profile includes normalizing a first usage profile of a first candidate virtual server using a first technology and normalizing a second usage profile of a second candidate virtual server using a second technology different than the first technology.

16. A system comprising:
at least one computing device for configuring a migration from a plurality of distributed virtual servers to a system of blades by performing a method comprising:
identifying among the plurality of distributed virtual servers a plurality of candidate virtual servers for inclusion in the migration;
collecting performance data for each candidate virtual server;
consolidating the performance data for each candidate virtual server into a usage profile;
normalizing the usage profile to allow representation of a statistical measure of resource usage by the candidate virtual server;
constructing a configuration of the plurality of candidate virtual servers within the system of blades; and
configuring the plurality of candidate virtual servers within the system of blades with the constructed configuration.

17. The system of claim 16, wherein the method further comprises:
grouping at least one of the candidate virtual servers; and
within the configuration, mapping the group of at least one candidate virtual servers to a set of blades and excluding from the set of blades any candidate virtual servers not included in the group.

18. The system of claim 17, wherein the method further comprises:
mapping, within the group, at least two candidate virtual servers to a sub-group; and
mapping of the candidate virtual servers of the sub-group to blades such that no more than one candidate virtual server of the sub-group is on a common blade.

19. A program product stored on a computer-readable storage medium, which when executed, is operable to configure a migration from a plurality of distributed virtual servers to a system of blades by performing a method comprising:
identifying among the plurality of distributed virtual servers a plurality of candidate virtual servers for inclusion in the migration;
collecting performance data for each candidate virtual server;
consolidating the performance data for each candidate virtual server into a usage profile;
normalizing the usage profile to allow representation of a statistical measure of resource usage by the candidate virtual server;
constructing a configuration of the plurality of candidate virtual servers within the system of blades; and
configuring the plurality of candidate virtual servers within the system of blades with the constructed configuration.

20. The program product of claim 19, wherein the method further comprises:
grouping at least one of the candidate virtual servers; and
within the configuration, mapping the group of at least one candidate virtual servers to a set of blades and excluding from the set of blades any candidate virtual servers not included in the group.

* * * * *